(12) United States Patent
Tapper

(10) Patent No.: US 7,579,557 B2
(45) Date of Patent: Aug. 25, 2009

(54) CABLE ENTRY DEVICE FOR EASY INSTALLATION

(76) Inventor: Paul Tapper, Spexhults Herrgård, SE-571 95 Nässjö (SE)

(*) Notice: Subject to any disclaimer, the term of this patent is extended or adjusted under 35 U.S.C. 154(b) by 24 days.

(21) Appl. No.: 10/590,610

(22) PCT Filed: Feb. 25, 2005

(86) PCT No.: PCT/SE2005/000272

§ 371 (c)(1), (2), (4) Date: May 16, 2007

(87) PCT Pub. No.: WO2005/081375

PCT Pub. Date: Sep. 1, 2005

(65) Prior Publication Data

US 2007/0272429 A1    Nov. 29, 2007

(30) Foreign Application Priority Data

Feb. 25, 2004   (SE) .................... 0400419

(51) Int. Cl.
*H02G 3/18* (2006.01)
(52) U.S. Cl. ............... 174/650; 174/152 G; 174/153 G; 16/2.1; 16/2.2; 248/56
(58) Field of Classification Search .......... 174/650, 174/153 G, 152 G, 152 R, 142, 72 A, 135, 174/652, 656, 665, 668, 669; 16/2.1, 2.2; 439/274, 275, 587; 248/56
See application file for complete search history.

(56) References Cited

U.S. PATENT DOCUMENTS

| | | | |
|---|---|---|---|
| 4,299,363 A | 11/1981 | Datschefski | |
| 4,839,937 A | 6/1989 | Oikawa et al. | |
| 5,090,644 A | 2/1992 | Lenker | |
| 5,285,013 A | 2/1994 | Schnell et al. | |
| 5,337,447 A | 8/1994 | Tanaka et al. | |
| 5,702,076 A | 12/1997 | Humber | |
| 5,732,440 A | 3/1998 | Wright | |
| 6,088,874 A * | 7/2000 | Nakata et al. ........... | 174/153 G |
| 6,194,659 B1 | 2/2001 | Cornu | |
| 6,278,061 B1 | 8/2001 | Daoud | |
| 6,297,457 B1 * | 10/2001 | Yamada et al. .......... | 174/152 G |
| 6,339,196 B1 * | 1/2002 | Uchida .................... | 174/153 G |
| 6,341,405 B1 | 1/2002 | Uchida | |
| 6,465,740 B2 * | 10/2002 | Kondoh et al. .......... | 174/152 G |

(Continued)

FOREIGN PATENT DOCUMENTS

DE    199 50 812 A1    5/2000

(Continued)

OTHER PUBLICATIONS

EPO, Exam Report in EP05711131.2, Mar. 14, 2008.

*Primary Examiner*—Angel R Estrada
(74) *Attorney, Agent, or Firm*—Potomac Patent Group PLLC

(57) ABSTRACT

A cable entry device (500, 600) for providing sealing in a space between a cable (1) and a surrounding material. The device comprises a covering (400, 510, 620) having sealing members (420, 430) for receiving said material therebetween. The sealing members are formed by a recess (410) in the covering. The covering comprises a recess for temporarily receiving the second sealing member when the covering is inserted into a hole in the material.

10 Claims, 9 Drawing Sheets

U.S. PATENT DOCUMENTS

| | | | |
|---|---|---|---|
| 6,489,559 B2 * | 12/2002 | Nakata et al. | 16/2.2 |
| 6,525,269 B2 * | 2/2003 | Sato | 174/153 G |
| 6,541,703 B2 * | 4/2003 | Nakata | 174/152 G |
| 6,675,439 B2 * | 1/2004 | Hashimoto | 16/2.1 |
| 6,685,195 B2 * | 2/2004 | Uchida et al. | 174/153 G |
| 6,708,366 B2 * | 3/2004 | Ono et al. | 16/2.1 |
| 6,727,432 B2 * | 4/2004 | Sato | 174/153 G |
| 6,768,058 B2 * | 7/2004 | Pallapothu | 174/153 G |
| 6,822,165 B2 | 11/2004 | Nishimoto | |
| 6,825,416 B2 * | 11/2004 | Okuhara | 174/153 G |
| 7,100,237 B2 | 9/2006 | Katayama | |
| 7,332,678 B2 | 2/2008 | Pyron et al. | |
| 7,420,125 B2 | 9/2008 | Tsukamoto et al. | |

FOREIGN PATENT DOCUMENTS

| | | |
|---|---|---|
| EP | 0 580 130 A1 | 1/1994 |
| EP | 1125797 B1 | 12/2005 |
| FR | 2813370 B1 | 11/2002 |
| JP | 63-184513 A | 11/1988 |
| JP | 06231642 | 8/1994 |
| JP | 08077854 | 3/1996 |
| JP | 10051924 A | 2/1998 |
| JP | 2000134770 A | 5/2000 |

* cited by examiner

CABLE ENTRY DEVICE FOR EASY INSTALLATION

TECHNICAL FIELD

The present invention relates to a cable entry device for a conduit or cable, and more particularly a cable entry device for providing sealing in a space between a cable and a surrounding material.

BACKGROUND OF THE INVENTION

When a cable or conduit is inserted through a hole of a material, there are a number of methods available for protecting the cable against damage and sealing one side of the material from the other. If the cable is inserted into the interior atmosphere, of e.g. a cubicle, from the ambient atmosphere, a hole is made in the cubicle for inserting the cable.

A rubber cable entry or grommet may be tightly inserted into the hole of the cubicle, and a cable can be inserted into the cable entry, causing sealing of the interior atmosphere of the cubicle from the surrounding atmosphere. However, this type of cable entry provides no locking of the cable to the cable entry. Also, it provides no locking of the cable entry to the surrounding material and may relatively easy be pushed out of the hole. The rubber cable entry known in the art comprises flanges between which the material, in which the cable entry is inserted, is received. The flanges are extending outwardly from the hole on respective sides of the material to provide sealing. However, when the cable entry is inserted into the hole, one of the flanges has do be pushed through the hole. The material of the flange has to be compressed to pass through the hole. Alternatively, a portion of the flange is pushed through the hole at the time, wherein the material of the flange does not have to be compressed as much. However, assembling of such a cable entry is cumbersome, especially for an assembler, who might fit hundreds of cable entries each day. Still another problem with the rubber cable entry is that it only fits material having a predetermined thickness. Different thickness requires different cable entries.

Another cable entry known in the art solves the problems of locking it to the surrounding material, and locking of the cable to the cable entry. Such a cable entry is generally made of a solid material, comprising several constituent parts, with a flexible sealing core. To connect the cable entry to e.g. a cubicle, a cylindrical main part of the fitting has to be provided with a sealing-ring before being entered into a hole of the cubicle. Furthermore, the main part is provided with threads, for locking the main part to the cubicle by a threaded nut. Alternatively, the surrounding material itself is threaded. Inside the main part is a bushing provided for sealing the space surrounding the cable. Also, the main part is provided with gripping tongues, which press the bushing towards the cable, causing both sealing and locking of the cable, when a cap is threaded onto the main part.

There is a problem with the cable entry providing locking in that it comprises several constituent parts, have a space-consuming design and is cumbersome to assemble. Also, when the cable is inserted into the cable entry and the cap is threaded to press the tongues towards the cable, the cable may not be completely locked, since the cable can slip in either direction if pulled, and the tongues may damage the coating of the cable. Furthermore, although the cable entry is manually adjustable to surrounding material of different thickness, assembling of the cable entry using the nut may be cumbersome, especially if it is assembled in a narrow space.

SUMMARY OF THE INVENTION

It is an object of the present invention to provide a cable entry that is easy to push though a hole of a material. Another object of the present invention to provide a cable entry that is self-adjusting within a predetermined range to the thickness of the material.

A cable entry device according to the invention for providing sealing in a space between a cable and a surrounding material achieves the above objects. The device comprises a covering having first and second sealing members for receiving said material therebetween. The sealing members are formed by a recess in the covering. The covering comprises means for temporarily receiving the second sealing member during the insertion of the covering into the hole.

The means for temporarily receiving the second sealing member may comprise a recess of the covering having a depth corresponding to the thickness of the second sealing member. Furthermore, the means for temporarily receiving the sealing member may comprise an irregular surface of the covering having a first and a second portion. The second portion will extend at least partially through a hole of a surrounding material when inserted therein.

The first and second sealing members are flexibly connected to the covering, and the cable entry is automatically adjustable to materials having different thickness when inserted into a hole therein.

Further embodiments of the invention will appear from the dependent claims.

It is an advantage of the present invention that it is very easy to push through a hole into which the cable entry is inserted. Moreover, it is an advantage that the cable entry is automatically adjustable to different thickness of a surrounding material. Moreover, it is an advantage of the present invention that it may comprise a core, wherein the cable entry may be locked to the surrounding material.

BRIEF DESCRIPTION OF THE DRAWINGS

Further objects, features, and advantages of the invention will appear from the following description of several embodiments of the invention, wherein various aspects of the invention will be described in more detail with reference to the accompanying drawings, in which.

DETAILED DESCRIPTION OF THE INVENTION

When a cable 1 is inserted into e.g. a cubicle, there are international standards for tightness classification, such as the IP classification system, that specify to what degree the internal atmosphere of e.g. a cubicle shall be sealed from the ambient atmosphere or fluid. Also, there are physical situations that require a cable 1 to be locked to a certain extent to the cubicle, to provide strain relief. A cable entry or locking grommet is provided for insertion into a hole of a material.

Figure 1:
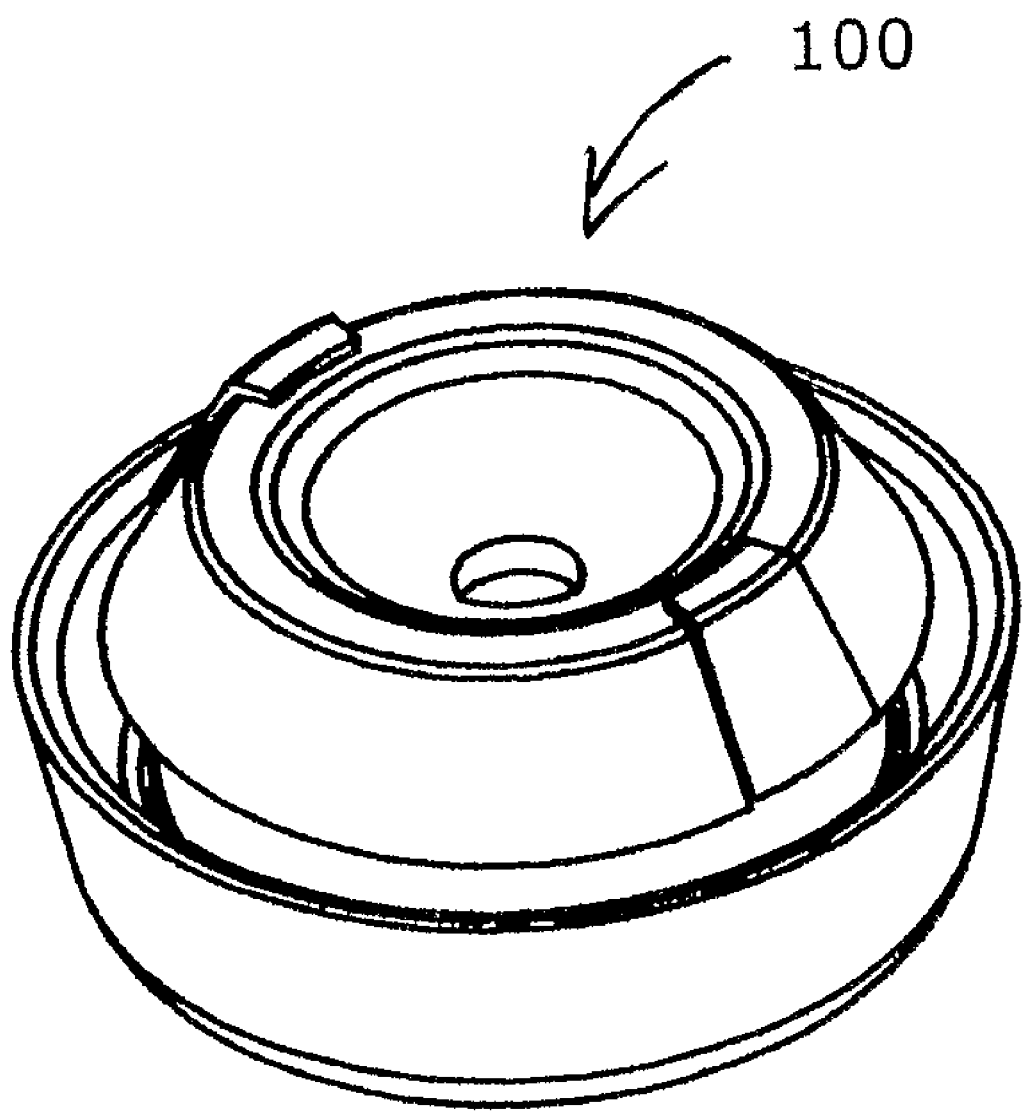
FIG. 1 is a perspective view of a cable entry device.

FIG. 1 illustrates a first embodiment of a cable entry device 100.

Figure 2:
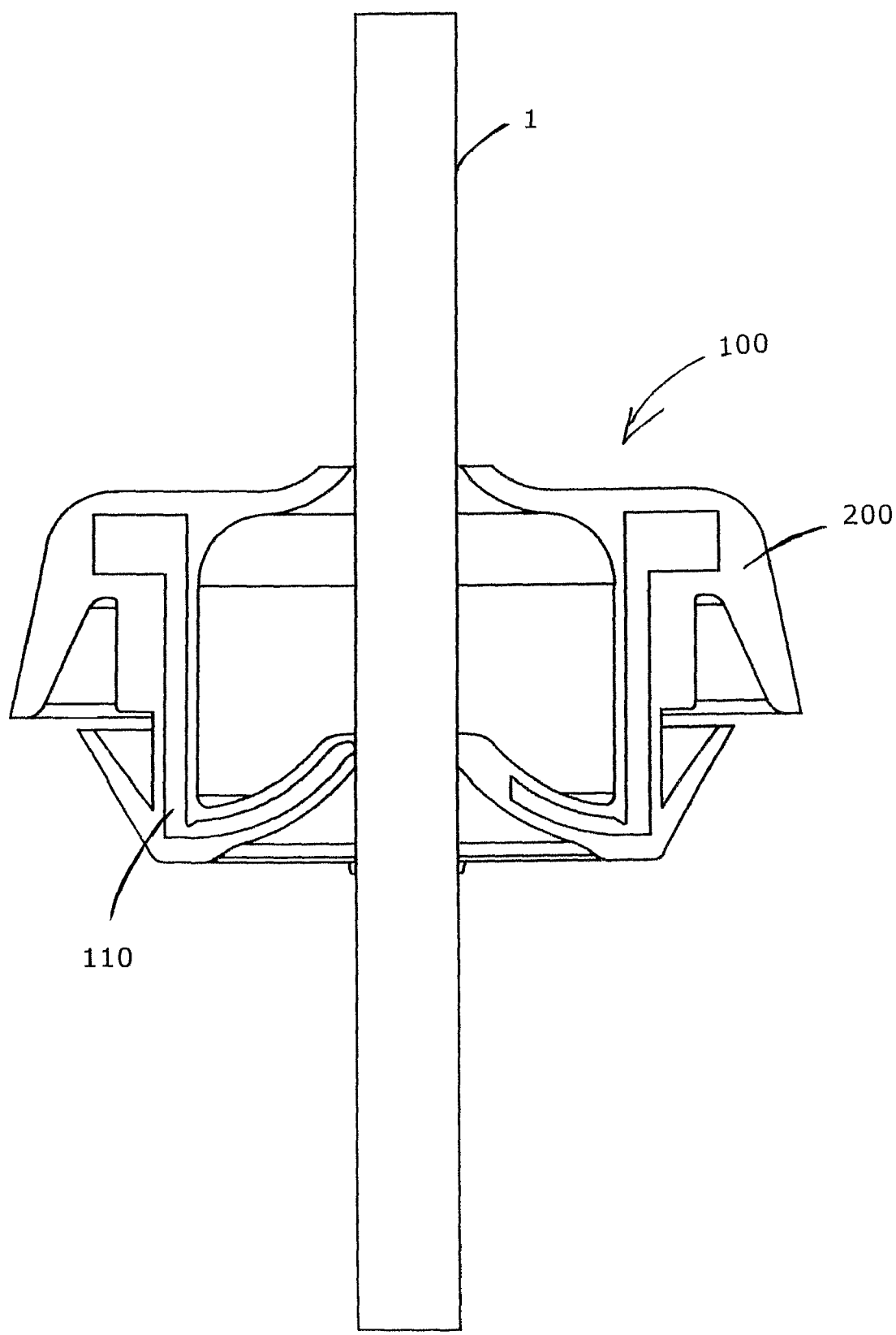
FIG. 2 is a cross-sectional view of a cable entry with a cable inserted therein.

FIG. 2 illustrates a first embodiment of the cable entry 100 in cross-section with the cable 1 inserted into it. The cable entry comprises a core 110 enclosed by a covering 200, preferably made of an elastomer, adaptable to a surrounding material for sealing a space between the cable and the material. As should be noted, the cable entry may in different embodiment be provided with a core, wherein in other embodiments the cable entry does not have a core.

Figure 3:
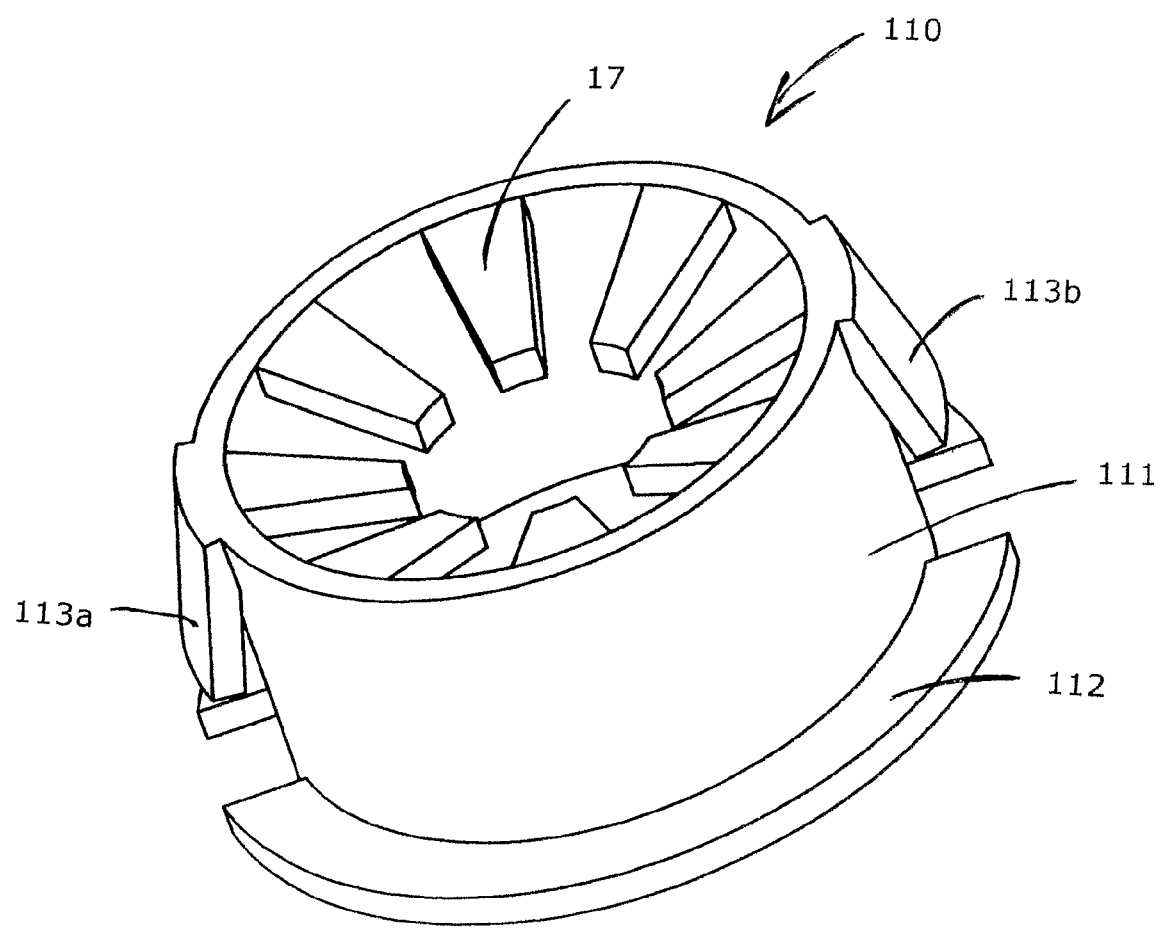
FIG. 3 is a perspective view of a first embodiment of a core comprising means for strain relief.

FIG. 3 discloses a first embodiment of the core 110. The core 110 comprises an intermediate portion 111 or support element extending axially, which may provide lateral support of the core 110. Locking means is connected to an outer periphery of the intermediate portion 111 for instantly connecting the core, and the covering surrounding it, to the surrounding material when it is inserted into a hole therein. In this embodiment, the locking means comprises a flange 112 and detents 113a, 113b connected to the intermediate portion 111. When the core is inserted into a hole of a material, the diameter of the hole is less than the diameter of the flange 112. Also, the distance between free ends of the detents 113a, 113b is larger than the diameter of the hole. The diameter of the intermediate portion 111 is less than the diameter of the hole.

The core of FIG. 3 is preferably made of a plastic having a certain flexibility, such as a polyamide, e.g. PA 6, that is soften by a softener, which makes the plastic tough.

The detents 113a, 113b are connected to the intermediate portion 111 at one end thereof, and extend from the intermediate portion towards the periphery of the flange 112. Due to the material of the core 110 having a certain flexibility, the free ends of the detents 113a, 113b when pushed through a hole, are urged towards the intermediate portion 111. Thus, the distance between said free ends will be less than the diameter of the hole. Thus, by simply pushing the core through the hole of a material, the free ends of the detents 113a, 113b will be urged towards the intermediate portion. When fully through the hole, the free ends of the detents 113a, 113b, will return to their initial position. Thus, the core is locked to the surrounding material by means of the detents 113a, 113b and the flange 112, which forms a stop when the core 110 is pushed into the hole. The flange 112 prevents that the core 110 can be pushed through the hole in one direction, preferably from the interior to the exterior of the cubicle. The detents 113a, 113b prevents the core to be pushed back through the hole in the reverse direction.

According to one embodiment of the core 110, it may have means for providing strain relief. At the inside of the intermediate portion 112 are provided radially spaced flexible locking tongues 17 slightly directed in the direction of insertion of the cable 1. When the cable is inserted into the core 110 the tongues will abut the cable. Pulling the cable in the reverse direction will increase the pressure from the tongues towards the cable, wherein the strain relief is provided. The length of the tongues may vary, as will be explained below.

Figure 4A:
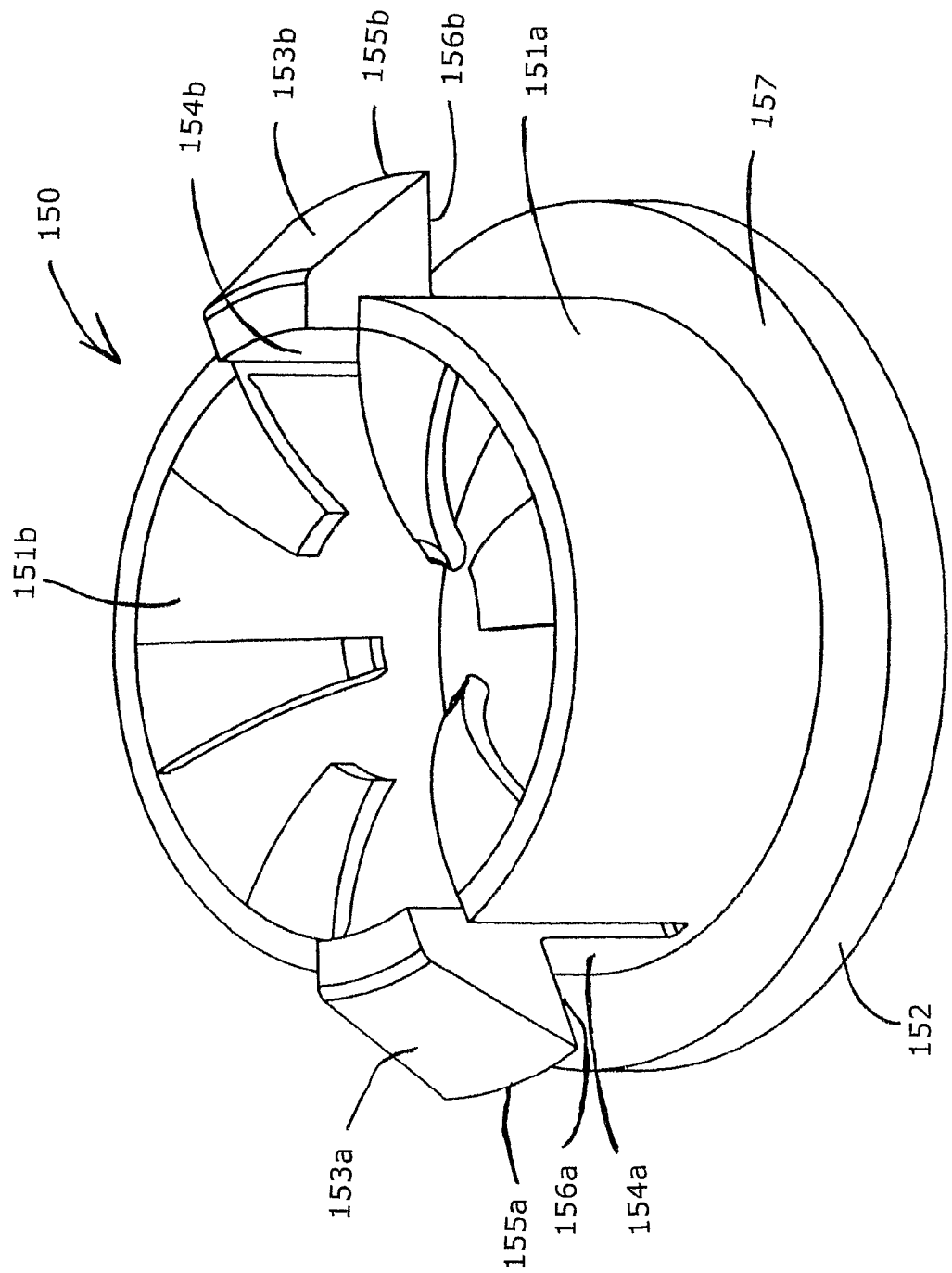
FIGS. 4a and 4b are perspective views of a second embodiment of a core comprising means for locking the core.
Figure 4B:
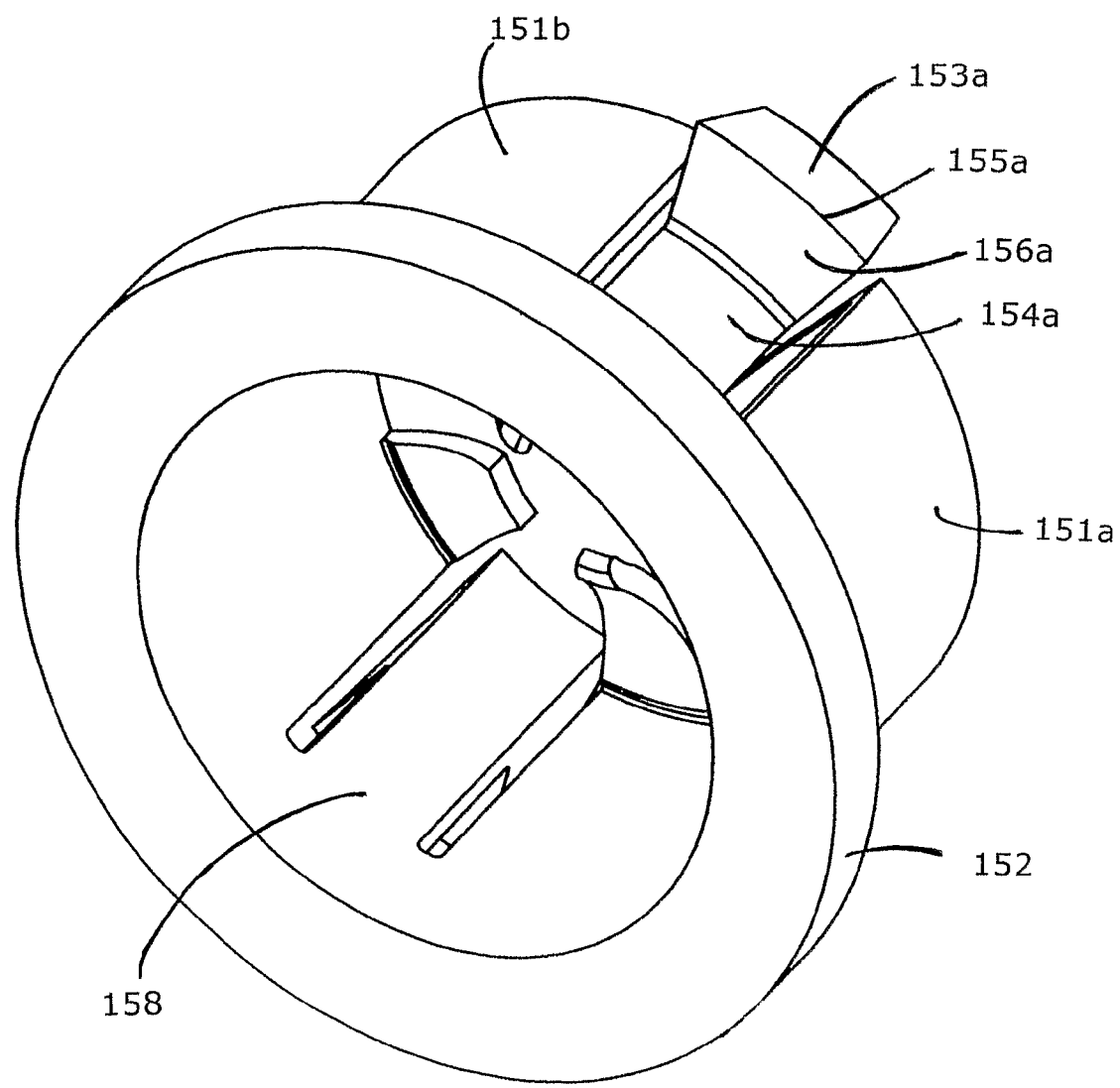

FIGS. 4a and 4b disclose another embodiment of a core 150. The core 150 is preferably made of a rigid material, such as a plastic as described above. The core comprises a first and a second intermediate portion 151a, 151b, and locking means for locking the core 150 to a surrounding material when inserted into a hole thereof. The locking means comprises a flange 152 and a first and second detent 153a, 153b. The flange 152 corresponds to the flange disclosed in FIG. 3. The detents 153a, 153b are connected to legs or flexible portions 154a, 154b.

The flange 152 is connected to a first end of the intermediate portions 151a, 151b. The intermediate portions 151a, 151b extend substantially perpendicular from an inner periphery of the flange 152. The length of the flexible portions 154a, 154b correspond substantially to the length of the intermediate portions 151a, 151b. The detents 153a, 153b are connected to an upper portion of the flexible portions 154a, 154b, and extends therefrom towards the outer periphery of the flange 152. From a tip 155a, 155b of the detents a support surface 156a, 156b extends towards the flexible portions 154a, 154b. A support surface 157 of the flange 152 and the support surface 156a, 156b of the detents 153a, 153b are substantially parallel.

A base 158 of the flexible portions 154a, 154b, are connected to the intermediate portions 154a, 154b adjacent to the flange 152. Thus, although the inherent material characteristics of the core 150 are quite rigid, the width and thickness of the base 158, and the position thereof, provide flexibility of the flexible portions in the lateral direction of the core. In operation, as the support surface 157 of the flange 152 and the support surfaces 156a, 156b of the detents 153a, 153b are substantially perpendicular, the forces exerted on the flexibly portions 154a, 154b are substantially in the longitudinal direction of the flexible portions. Thus, the thickness of the base 158 may be dimensioned to comply with strain relief requirements.

When at least the intermediate portions 154a, 154b are enclosed by a covering, as disclosed below, the flexible portions 154a, 154b, are supported at an inner and outer side of the core 150 by said covering. Thus, the core, which is flexible, allows the flexible portions 154a, 154b to be urged towards the center of the core 150 when pushed through the hole, allowing the detents 153a, 153b to pass through the hole. When fully through, the covering will return the flexible portions to their initial position, wherein the detents instantly connect the core 150 to the surrounding material. The core, and the covering, may easily be detached from the material surrounding it, wherein the cable entry may be reused. The core and the covering may be detached simply by pushing the detents 153a, 153b inwardly towards the center of the core, wherein it may be removed from the hole.

The thickness of the base 158 may be thinner than the remaining thickness of the flexible portions 154a, 154b. Thus, the flexibility may be further increased, whereas the material of the core 150 may be even more rigid. To obtain a good flexibility, the thickness of the base 158 is approximately 50% of the thickness of the flexible portions 154a, 154b. However, the relationship may be smaller or larger, or even substantially the same, depending on the requirement of flexibility and strength.

The flexible portions 154a, 154b, may be provided by forming slots in the intermediate portions 151a, 151b.

In the embodiments shown in FIGS. 3, 4a and 4b, the intermediate portions 111, 151a, 151b are substantially cylindrically shaped and extending substantially perpendicular from the inside of the flange 112, 152 in the longitudinal direction of the core 100, 150. However, the intermediate portions 111, 151a, 151b may also be slightly conically shaped. The intermediate portions 111, 151a, 151b may alternatively have a polygonal cross section, as long as it fits into a hole of a material. Furthermore, the flange 112, 152 may be divided into sections forming several individual flanges circumferentially spaced around the intermediate portions 111,

151*a*, 151*b*. Also, any number of detents 113*a*, 113*b*, 153*a*, 153*b*, which provide sufficient locking of the core, is possible.

By altering the distance between the detents 113*a*, 113*b*, 153*a*, 153*b* and the diameter of the flange 112, 152, core 110, 150 may be adapted to holes of different diameter. Furthermore, by altering the distance between the free end/tip of the detents 113*a*, 113*b*, 153*a*, 153*b* and the flange 112, 152, the core 110, 150 may be adapted to material of different thickness.

Figure 5:
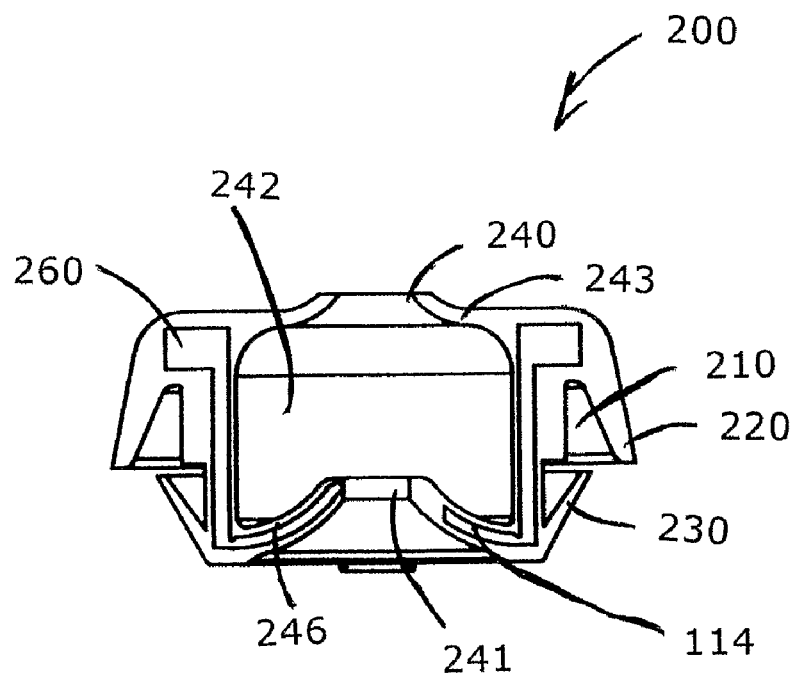
FIG. 5 is a cross-sectional view of a covering.

FIG. 5 discloses the covering 200 for enclosing the core 110, 150. In the outer circumference of the covering 200 a recess 210 is provided for receiving the surrounding material when the cable entry is inserted into a hole. The recess 210 provides first and second flexible sealing members 220, 230 in the form of flanges on opposed sides of the recess 210, for sealing the space between the covering and the surrounding material.

The covering 200 has first and second circular cuts 240, 241 provided on a first and second end portion of the covering 200, respectively. A cavity 242 is formed between the end portions. The end portions together with the cavity 242 form a passage, in which the cable 1 is to be inserted.

The first end of the covering surrounding the upper cut 240 forms a flexible collar 243, creating a tight seal between the covering 200 and the cable 1 when the cable 1 is inserted through the first cut 240.

At least one boss (not shown) may be provided on the inside of the collar 243. An early release of vacuum in the cavity 242 is provided by the boss when the tool forming the cavity is pulled out of the first cut 240 during manufacturing. This allows for the manufacture of a very thin membrane, forming a penetrable seal (not shown) of the second cut 241. The penetrable seal can be removed by simply penetrating the cable 1 trough the seal rather than using a tool to create a circular hole. The penetrable seal makes it possible to seal a hole in the material surrounding the covering 200 even if the cable 1 is not inserted therein. The penetrable seal may alternatively be provided at the first cut 240. Thus, the boss may be provided at the inside of the second cut 241.

The cavity 242 comprises a circumferentially extending slot 260 for receiving the flange 112, 152 of the core 110, 150. The inner surface of the cavity 242 will enclose the intermediate portions 111, 151*a*, 151*b*. The detents 113, 153*a*, 153*b* will extend out of cuts (not shown) of the covering when enclosed thereof.

When the core 110 is enclosed by the covering 200, a cylindrical lip 246 may enclose the tongues 114. The lip 246 is connected to the covering at the side of the second cut 241 extending therefrom towards the intermediate portion 111. When the cable 1 is inserted into the second cut 241 the tongues 114 enclosed by the lip 246 are abutting, but not damaging, the cable 1. Alternatively, the lip 246 is partly slit open. Furthermore, the space between the cable 1 and the covering is sealed when the cable 1 is inserted therein.

The tongues 114 and the lip 246 provide a sealed locking of the cable 1 to the cable entry, which locking is instant when the cable 1 is inserted into the cable entry.

The covering 200 is provided with a cut (FIG. 1) for receiving the detents 113*a*, 113*b*, 153*a*, 153*b*. Thus, the detents 113*a*, 113*b*, 153*a*, 153*b* are not encapsulated by the covering 200 and can directly abut against the surrounding material.

The second end of the covering 200, to be pushed through a hole in the material, has a diameter, which is less than the diameter of the hole. Furthermore, the second sealing member 230 extends outwardly from the second end of the covering towards the free end of the first sealing member 220. At the free end of the second sealing member 230 the diameter is larger than the diameter of the hole. When pushed through the hole, the second sealing member 230 will be urged towards the center of the covering 200, wherein the cable entry is easy to insert into the hole of the material, due to the recess 210 between the second sealing member 230 and the center portion of the covering 200.

When the cable entry is inserted into the hole of the material the flexible first sealing member 220 of the covering 200 is extending outwardly from an edge of a first side of the material surrounding the hole. When the free end of the first sealing member 220 meets the material it is compressed and slides outwardly from the hole as the cable entry is further pressed through the hole. When the second sealing member 230 is fully through the hole, the first sealing member provides a biasing force on the covering urging the second sealing member towards a second side of the material surrounding the covering 200. Thus, the space between the covering 200 and the surrounding material is sealed, as the free ends of the sealing members 220, 230 abut the material received therebetween. Consequently, the space between the covering 200 and the surrounding material is sealed. If the covering 200 encloses a core, the covering 200 is locked to the hole of the material by means of the locking means, and a seal to both sides of the surrounding material is provided.

In another embodiment, locking means is provided as an integral part of the covering as solid rubber or elastomer detents. However, the arrangement of these detents is substantially the same as the detents as set forth above, albeit formed as integral with the covering. Thus, the elastomer detents are extending outwardly towards the first sealing member 220 of the covering 200 for providing locking of the covering according to the same principles as set out above. If the covering comprises a core, the intermediate portion is provided with cut-in portions for receiving each of the elastomer detents when the cable entry is inserted into a hole.

Figure 6:
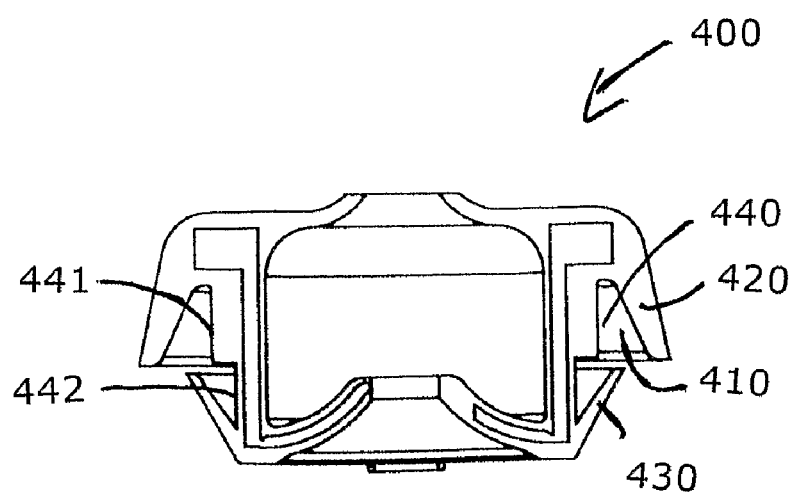
FIG. 6 is a cross sectional view of another embodiment of the covering.

FIG. 6 discloses a covering 400 according to the invention. A recess 410 is provided in the outer circumference of the covering 400 for forming first and second sealing members 420, 430, such as flexible flanges. The covering 400 comprises means for temporarily receiving a second sealing member 430 insertion of the covering into the hole. One side of the recess 410, which is outwardly facing the sealing members 420, 430 and inwardly facing the intermediate portion of the core, when receiver therein, or the cavity, has an irregular surface 440. A first portion 441 of the irregular surface 440 has a diameter, which is larger than the diameter of a second portion 442 of the irregular surface 440. The second 442 portion may be formed as a recess of the covering 400 or the first portion 441. The first portion 441 faces outwardly an inner side of the first sealing member 420. The second portion 442 faces outwardly an inner surface of the second sealing member 430. The difference in diameter between the first and second portions 441, 442 corresponds substantially to twice the thickness of the second sealing member 430 of the covering 400. Thus, when the covering 400 is pressed through a hole, the second sealing member 430 is received within the second portion of the irregular surface 440, wherein it is even easier to press the covering through the hole as the covering 400 does not have to be compressed at all. The diameter of the first portion 441 of the irregular surface 440 is less than the diameter of the hole. The diameter of the first portion 441 is preferably only slightly less than the diameter of the hole, wherein the covering 400 is fitted to the surrounding material. Correspondingly, the diameter of the second portion 442 of the irregular surface 440 plus twice the thickness of the second sealing member 430 of the covering 400 is slightly less than the diameter of the hole.

The length of the first portion 441 of the irregular surface 440, and the total length of the irregular surface 440 is dimensioned such that said first portion will extend at least partially through the hole when the covering is inserted therein. Thus, when the sealing members 420, 430 extend outwardly from the hole, the covering will be laterally supported by the first portion 441.

The recess 410 and the sealing members 420, 430 according to the embodiment shown in FIG. 6 provide instant adjustment of the covering to different thickness of the surrounding material when the covering is pressed through a hole thereof. The first sealing member 420 extends outwardly from the upper end of the covering. The second sealing member 430 extends outwardly from the second end of the covering 400. The thickness of the sealing members 420, 430 is such that they are flexible at least 90 degrees relative the irregular surface 440. When the covering 400 is inserted into a hole, the free ends of the sealing members 420, 430 will automatically slide outwardly from the hole. The distance between the connection points of the sealing members 420, 430 determines the range of material thickness, to which a specific covering is suitable.

If the covering 400 comprises a core 110, 150, the distance between the support surfaces 155a, 155b of the detents 113a, 113b, 152a, 153b and the size of the recess 410 determine the range of material thickness, to which a specific covering is suitable.

Figure 7:
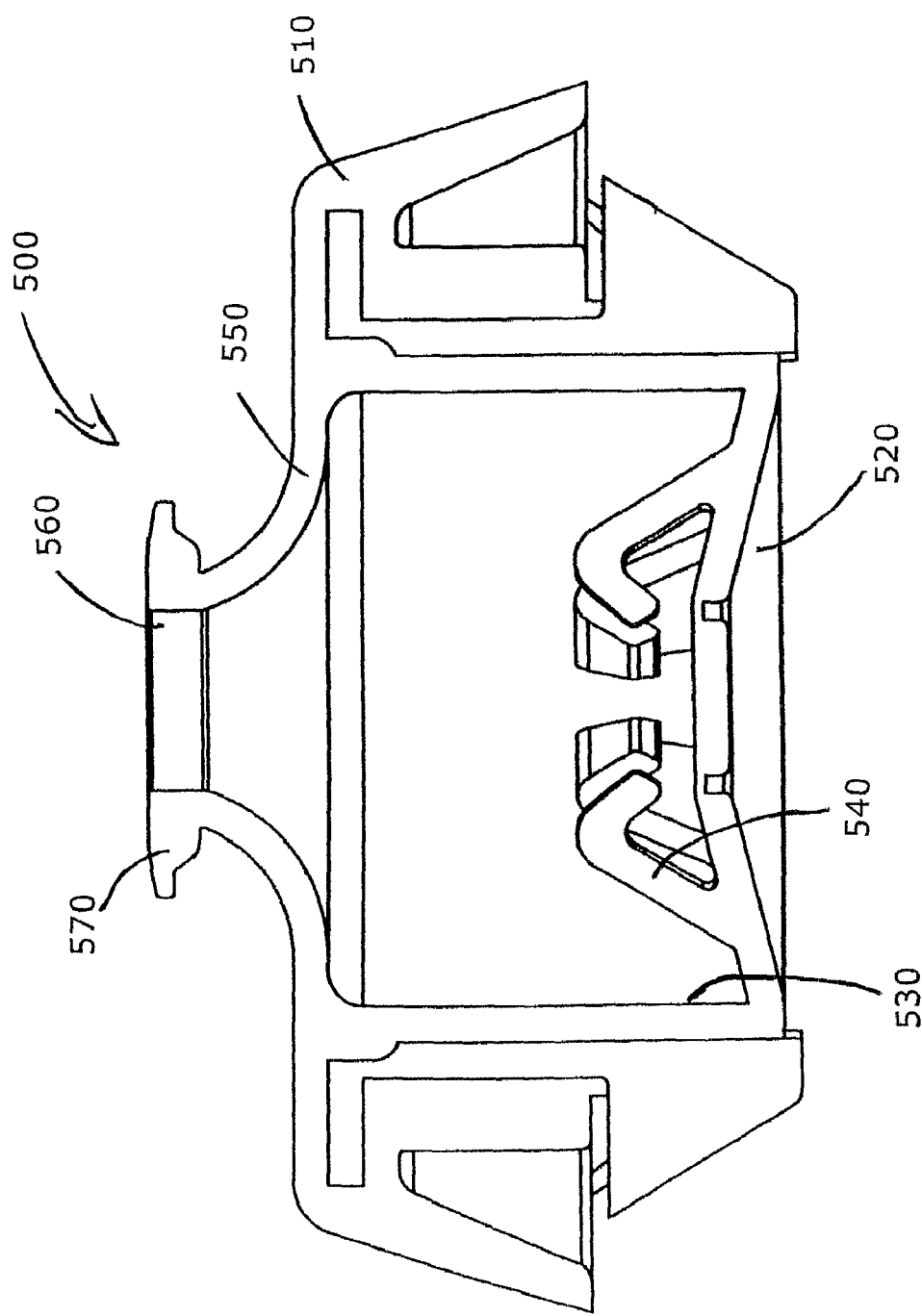
FIG. 7 is a cross sectional view of another embodiment of the covering enclosing the core of FIGS. 4a and 4b.

FIG. 7 discloses a cable entry 500 comprising a covering 510 and a core 150. Parts of the covering 510 not explicitly described with regard to FIG. 7 correspond to the parts described with regard to FIG. 6. The covering 510 comprises strain relief means integral with the covering. On an inner side of a first end 520 of the covering 510 facing a cavity 530 of the covering 510 are provided hooks 540 for abutting the cable when inserted into the cavity. When the cable is inserted, the hooks being flexible are urged towards the periphery of the covering 510. When the cable is pulled in the reverse direction, a friction between the cable and the hooks 540 will provide strain relief. The harder the cable is pulled in the reverse direction, the greater is the friction up to a certain amount. The amount of the friction is dependent of the number and material of the hooks 540, and the material of the covering of the cable.

A conically shaped second end 550 opposing the first end 520 of the covering 500 may have means for providing strain relief. At the top end of the conically shaped portion is an inwardly facing circular surface 560 provided. The circular surface extends substantially in the longitudinal direction of the covering 510, i.e. in the direction of insertion of the cable. When a cable is inserted through the covering 510, the circular surface will abut the cable, wherein a friction is created therebetween. When the cable is pulled in the reverse direction the friction will cause the conically shaped portion 550 to be compressed. Thus, a certain strain relief will be provided, the amount of which depending on the size and type of material of the circular surface 560, and the material of the cable. To further increase the strain relief, protrusions 570 may be provided at the outer periphery of the top end of the conical portion 550. When the cable is pulled backwards, the protrusions 550 will cause the circular surface 560 to remain parallel with the cable, wherein the friction is maintained. As long as the conically shaped end 550 does not collapse, i.e. extend in the reverse direction of insertion of the cable 1, strain relief will be provided.

If the covering 500 of FIG. 7 comprises a core 150, the conical end 560 when compressed will be urged towards the flange 152 of the core 150. Thus, the covering is more rigid when enclosing a core, wherein it is heavier to compress the conical portion 550. Thus, the strain relief may be even further improved.

Figure 8A:
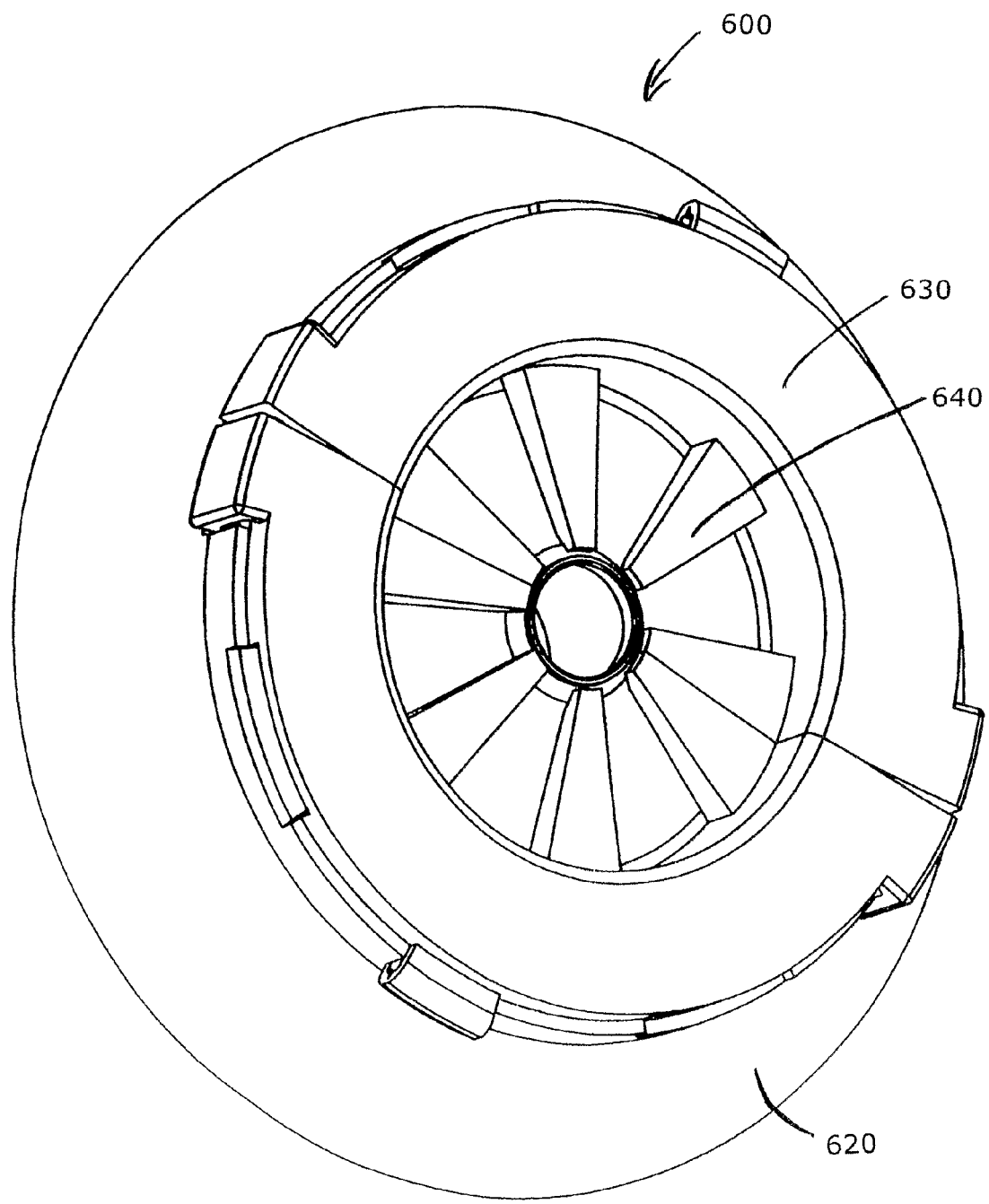
FIGS. 8a and 8b are cross-sectional views of a cable entry comprising a core, a covering and detachable means for strain relief.
Figure 8B:
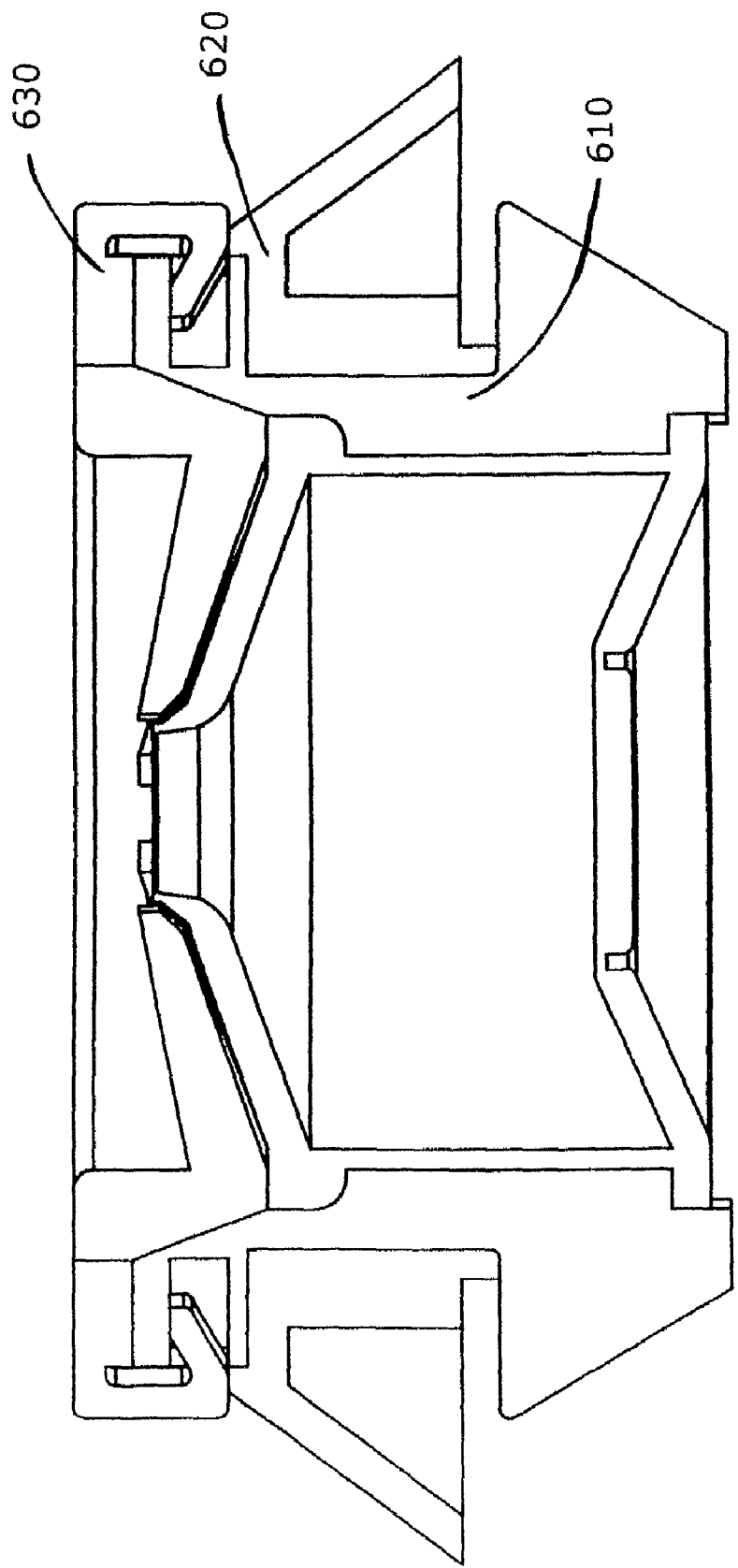

FIGS. 8a and 8b disclose a cable entry 600 having a core 610 and a covering 620. A detachable strain relief means 630 may be attached at one end of the cable entry 600 to the core 610. The strain relief means comprises tongues 640 as disclosed above. The length of the tongues is alternating shorter and longer. Thus, the strain relief means fit cables of different size. The strain relief means may comprise two equal halves snap fitted to the core 610. The strain relief means may be detached when the cable is inserted into the cable entry 600, wherein the cable may be removed from the cable entry.

A cable entry device according to the invention may not comprise the core. Thus, the covering as disclosed above may be used without the core, wherein several advantages may still be provided, such as the irregular surface for easy push trough and/or the self-adjustment to different thickness.

The core and covering is disclosed as circular. However, they may equally be quadrilateral or polygonal depending on the form of the hole into which they should fit.

The covering is made of a flexible material, such as an elastomer, e.g. TPE (thermoplastic elastomer), EPDM (Ethylene-Propylene-Diene-Monomer), or chloroprene.

The present invention has been described as applicable to a cubicle by way of example. However, the invention is not limited to this single application, it is also applicable to holes of many other applications, such as electrical control cubicles, instrument housings, household appliances, cable entries in walls, conduit entries etc. Also, for simplicity reference has been made to a cable, which is not intended to limit the scope of the invention. As is understood, the invention may equally be used with e.g. a conduit for conducting fluids, or a wire. The scope of the invention is best defined of the appended independent claim.

The invention claimed is:

1. A cable entry device, comprising a covering for providing sealing in a space between a cable and a surrounding material, the sealing comprising first and second sealing members for receiving said material therebetween formed by a recess in outer periphery of the covering; and a core comprising at least one axially extending intermediate portion connected to a flange, and locking means comprising detents, for instantly locking the core to the surrounding material when inserted into a hole of the surrounding material; wherein the core is substantially enclosed by the covering, and the detents extend through cuts of the covering.

2. The cable entry device of claim 1, wherein the covering further comprises means for temporarily receiving the second sealing member during insertion of the covering into the hole.

3. The covering according to claim 2, wherein the means for temporarily receiving the sealing member comprises an irregular surface of the covering having a first and a second portion, the first portion having a diameter corresponding to the diameter of the hole, to which the device is dimensioned for, and the diameter of the second portion plus twice the thickness of the second sealing member correspond to the diameter of said hole.

4. The covering according to claim 3, wherein the second portion of the irregular portion will extend at least partially through the hole when inserted therein.

5. The covering according to claim 2, wherein the first and second sealing members are flexibly connected to the covering.

6. The covering according to claim 2, wherein the diameter at a free end of the first sealing member is larger than the diameter of a free end of the second sealing member.

7. The covering according to claim 2, wherein the first sealing member extends outwardly from a first end of the covering towards the second sealing member, and the second sealing member extends outwardly from a second end of the covering towards the first sealing member.

8. The covering according to claim 2, wherein the first sealing member provides a biasing force on the covering when inserted into a hole of the material.

9. The covering according to claim 8, wherein free ends of the first and second sealing members abut a first and a second side of a material, respectively, when inserted into a hole therein.

10. Use of the covering according to claim 2 as a cable entry device.

* * * * *